US008851044B2

(12) United States Patent
Samko et al.

(10) Patent No.: US 8,851,044 B2
(45) Date of Patent: Oct. 7, 2014

(54) VANE-TYPE ROTARY ACTUATOR OR AN INTERNAL COMBUSTION MACHINE

(76) Inventors: Ivan Samko, Kievskaya oblast (UA); Svyatoslav Samko, Kievskaya oblast (UA)

( * ) Notice: Subject to any disclaimer, the term of this patent is extended or adjusted under 35 U.S.C. 154(b) by 1857 days.

(21) Appl. No.: 11/989,185

(22) PCT Filed: Oct. 7, 2005

(86) PCT No.: PCT/UA2005/000044
§ 371 (c)(1),
(2), (4) Date: May 28, 2010

(87) PCT Pub. No.: WO2007/011318
PCT Pub. Date: Jan. 25, 2007

(65) Prior Publication Data
US 2010/0258075 A1    Oct. 14, 2010

(30) Foreign Application Priority Data

Jul. 22, 2005    (UA) .................................. 200507283

(51) Int. Cl.
| F02B 53/00 | (2006.01) |
| F01C 1/077 | (2006.01) |
| F01C 1/067 | (2006.01) |
| F16H 35/00 | (2006.01) |
| F16H 35/02 | (2006.01) |

(52) U.S. Cl.
CPC ........... *F01C 1/077* (2013.01); *F16H 2035/003* (2013.01); *F01C 1/067* (2013.01); *F16H 35/02* (2013.01)
USPC .......................................... 123/241; 418/36

(58) Field of Classification Search
CPC ... F16H 2035/003; F16H 15/38; F02B 53/02; F02B 53/00; Y02T 10/17; F01C 9/002; F01C 17/06; F01C 9/00; F01C 1/067; F04C 15/0061

USPC .............. 418/34–36; 123/200, 243, 241, 245, 123/43 B; 74/63, 84 R, 393
See application file for complete search history.

(56) References Cited

U.S. PATENT DOCUMENTS 2,253,270 A * 8/1941 Golber ............................ 74/437
2,897,765 A * 8/1959 Kitano ........................ 418/206.5
(Continued)

FOREIGN PATENT DOCUMENTS

| CH | 182932 A | 3/1936 |
| DE | 641476 A | 2/1937 |

(Continued)

OTHER PUBLICATIONS

International Preliminary Report on Patentability, PCT/UA2005/000044.

(Continued)

*Primary Examiner* — Mary A Davis
*Assistant Examiner* — Jason T Newton
(74) *Attorney, Agent, or Firm* — Hamilton, Brook, Smith & Reynolds, P.C.

(57) ABSTRACT

In an embodiment, a rotary vane-type geared internal combustion engine includes a stator, two coaxial rotors and a reducing gear. The stator has an internal cylindrical working area and intake and outlet openings. The two coaxial rotors with two vanes on each rotate to define four chambers separated by four vanes. The reducing gear has a main shaft, a shaft of an auxiliary device and two shafts of the two coaxial rotors positioned between the main shaft and the shaft of the auxiliary device. Each shaft of the reducing gear has a pair of two-tooth gears reciprocally positioned at a 90 degree angle.

2 Claims, 5 Drawing Sheets

(56) References Cited

U.S. PATENT DOCUMENTS

| | | | |
|---|---|---|---|
| 3,279,638 A | | 10/1966 | Merry |
| 3,398,643 A | | 8/1968 | Schudt |
| 3,430,573 A | * | 3/1969 | Groeger .................. 418/36 |
| 3,730,654 A | * | 5/1973 | McMahon .................. 418/34 |
| 3,769,946 A | * | 11/1973 | Scherrer .................. 418/36 |
| 4,003,681 A | * | 1/1977 | Wildhaber .................. 418/36 |
| 4,010,716 A | * | 3/1977 | Minka .................. 123/245 |
| 4,028,019 A | * | 6/1977 | Wildhaber .................. 418/36 |
| 4,057,374 A | | 11/1977 | Seybold |
| 5,083,539 A | | 1/1992 | Cornelio |
| 5,405,300 A | * | 4/1995 | Sakita .................. 475/225 |
| 6,446,595 B1 | | 9/2002 | Sakita |
| 2004/0261758 A1 | * | 12/2004 | Fong et al. .................. 123/241 |
| 2005/0013719 A1 | * | 1/2005 | Fong et al. .................. 418/36 |
| 2006/0027207 A1 | * | 2/2006 | Hangan .................. 123/245 |
| 2007/0036667 A1 | * | 2/2007 | Sterk .................. 418/35 |
| 2008/0276902 A1 | * | 11/2008 | Manthry et al. .................. 123/238 |

FOREIGN PATENT DOCUMENTS

| | | |
|---|---|---|
| DE | 3623929 | 1/1988 |
| DE | 3623969 A1 | 2/1988 |
| FR | 758160 A | 1/1934 |
| GB | 528111 A | 10/1940 |
| RU | 2097586 C1 | 11/1997 |
| RU | 2 193 675 C2 | 11/2002 |
| SU | 1409216 A1 | 7/1988 |
| WO | WO 2004/067914 A1 | 8/2004 |
| WO | WO 2007/097733 A | 8/2007 |

OTHER PUBLICATIONS

European Search Report, EP 05 79 4193, mailed Jul. 21, 2008.

* cited by examiner

VANE-TYPE ROTARY ACTUATOR OR AN INTERNAL COMBUSTION MACHINE

RELATED APPLICATIONS

This application is the U.S. National Stage of International Application No. PCT/UA2005/000044, filed Oct. 7, 2005, published in Russian, and claims priority under 35 U.S.C. §119 or 365 to Ukrainian Patent Application No. a 2005 07283, filed Jul. 22, 2005.

BACKGROUND OF THE INVENTION

The invention relates to the engine-building industry, to rotary combustion engines converting heat energy into mechanical energy.

DESCRIPTION OF THE RELATED ART

Rotary vane-type machine with blades kinematically connected with elliptically-shaped gears was used as the prototype (U.S. Pat. No. 5,083,539, MIIK F01C 1/077, 19/00; F02B 53/12; HKB 123/210, 123/245, 418/36, 418/14, claimed Oct. 19, 1990, published Jan. 28, 1992, author Seno L. Cornelio). The machine consists of two coaxial rotors with two vanes on each one, and main shaft. The main shaft is connected with rotor shafts by two pairs of non-circular gears.

BRIEF DESCRIPTION OF THE SEVERAL VIEWS OF THE DRAWING(S)

Figure 4:
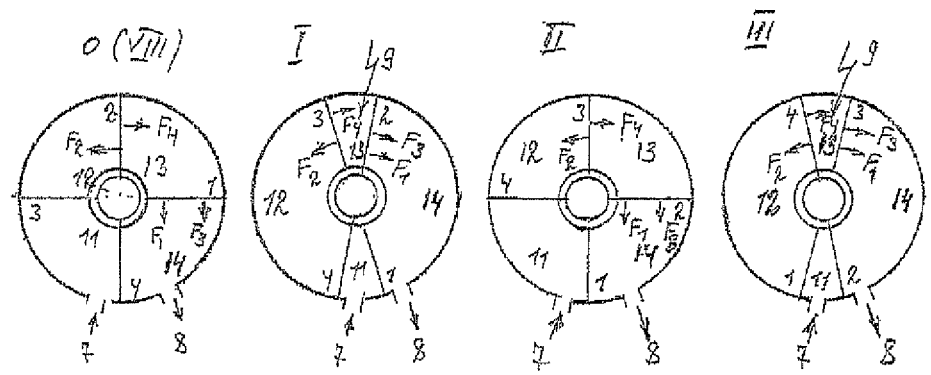

FIG. 4 illustrated an example of four in eight phases of the rotor vanes reciprocal position.

Figure 5:
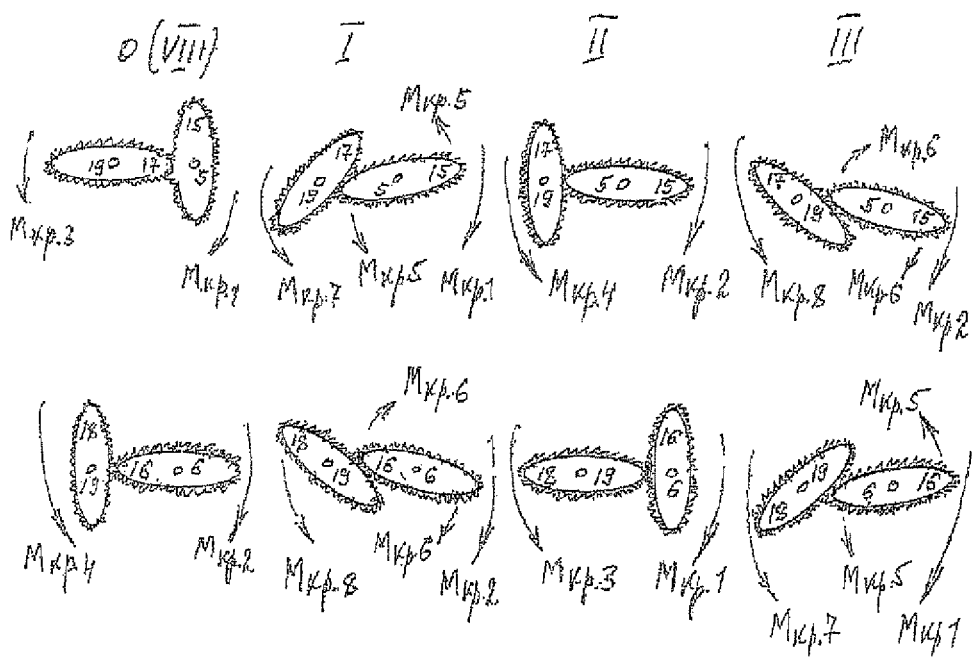

FIG. 5 illustrates the respective phases of elliptical gears reciprocal positions.

Figure 6:
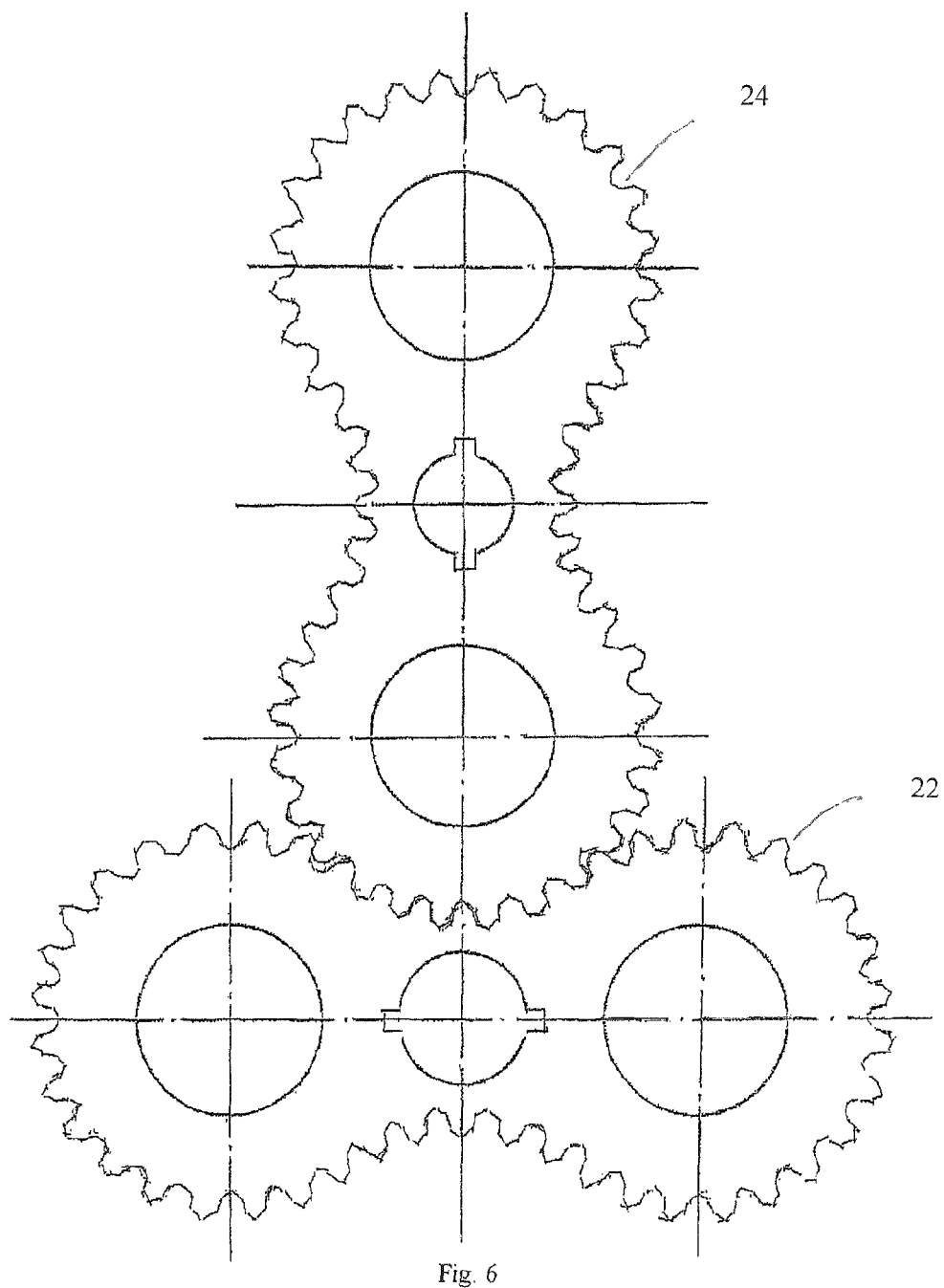

FIG. 6 illustrates two-tooth gears having crowns that have a shape of mating convex and concave arcs.

Figure 7:
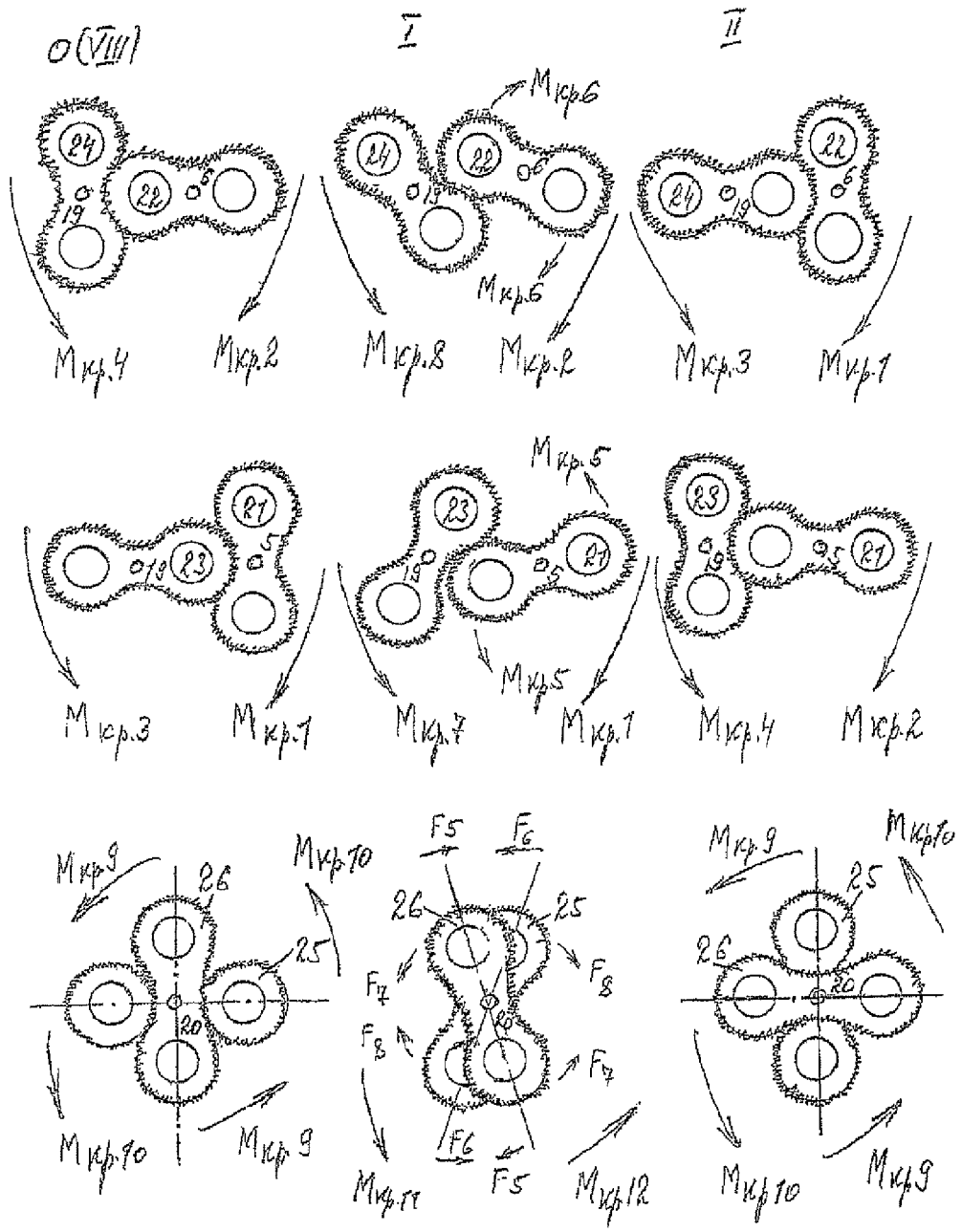

FIG. 7 illustrates a kinematic interaction of the rotor shaft gears with the main shaft gears and the auxiliary device gears.

Figure 8:
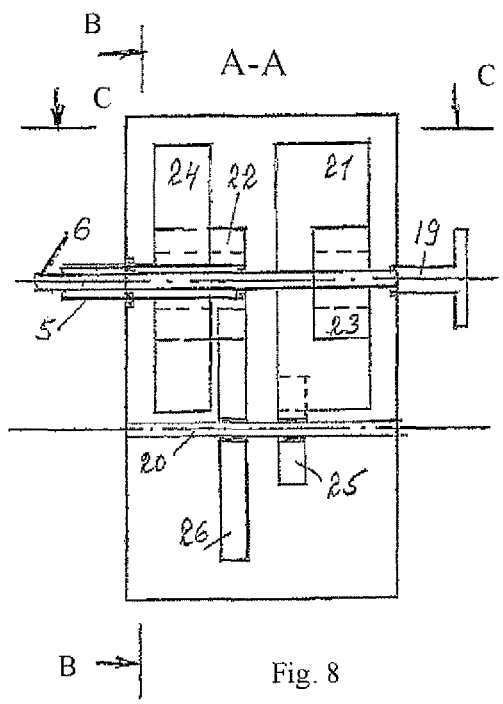

FIG. 8 illustrates a cut-away view of the rotary vane-type geared combustion engine.

Figure 9:
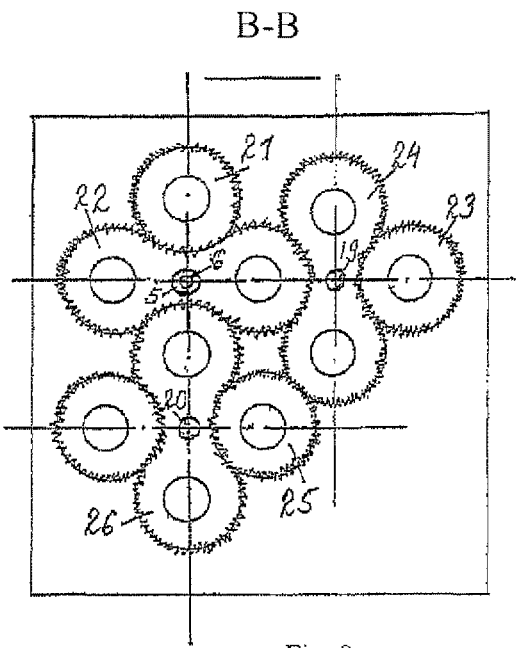

FIG. 9 illustrates a cut-away view of the rotary vane-type geared combustion engine taken along line B-B in FIG. 8.

Figure 10:
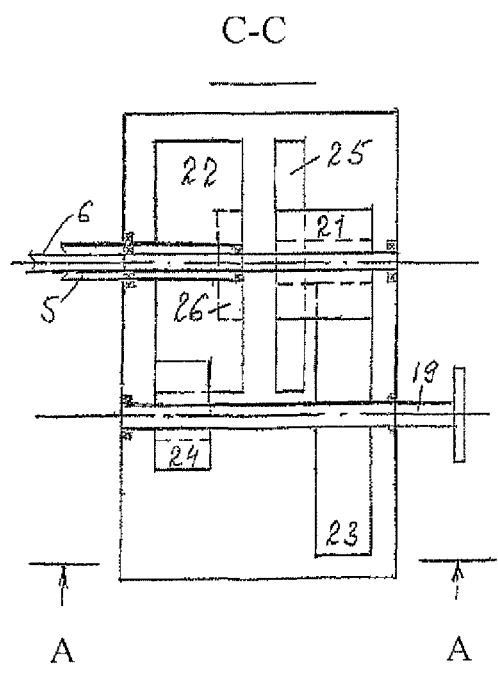

FIG. 10 illustrates a cut-away view of the rotary vane-type geared combustion engine taken along line C-C in FIG. 8.

DETAILED DESCRIPTION OF THE INVENTION

Figure 1:
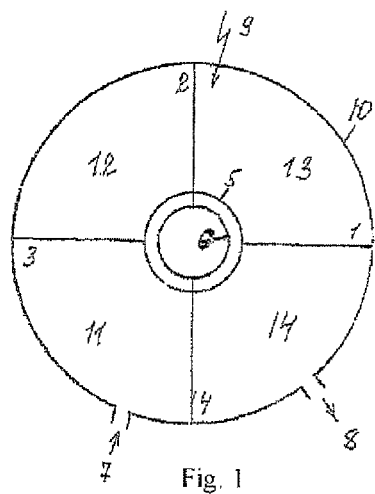
FIG. 1 is a diagram illustrating a particular embodiment of a rotary vane-type geared combustion engine.
Figure 2:
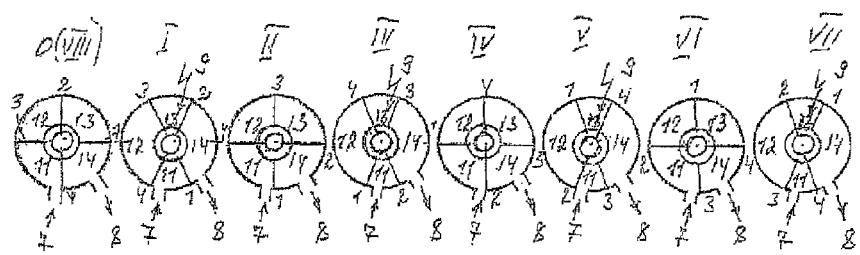
FIG. 2 is a diagram presenting eight phases of rotor vanes positional relationship during one complete revolution of the shaft.
Figure 3:
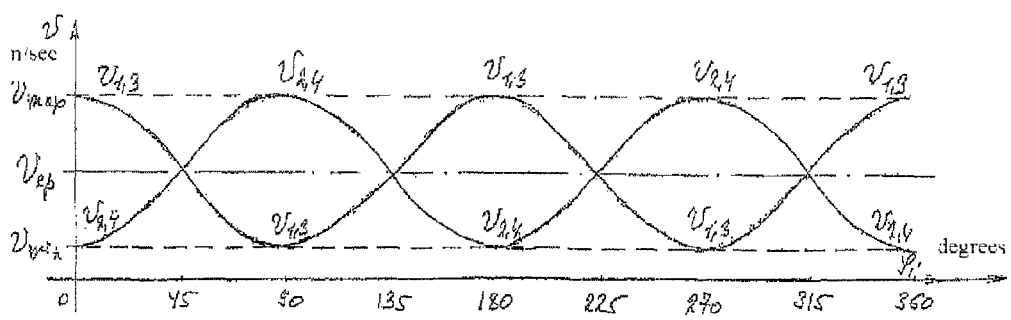
FIG. 3 is a graph that depicts change in rotor shafts rotating speed.

The principle used for design and operation of rotary engine, taken as the prototype, is represented on the diagrams (FIGS. 1, 2 and 3), which present the key components of the rotary engine (FIG. 1), eight phases of rotor vanes positional relationship during one complete revolution of the shaft (FIG. 2) and the graph (FIG. 3) that depicts change in rotor shafts rotating speed. Coaxial vane rotors are turning around the fixed axis of engine rotation in one direction with variable speed, which is alternatively changing from minimum to maximum and vice versa two times per full revolution of the shaft dephasing one to another by 90 degrees. Specifically, the following conventions are used for engine elements and zones:

1, 3—first rotor vanes rigidly mounted on the shaft 5;
2, 4—second rotor vanes mounted rigidly on the shaft 6;
5, 6—shafts of the first and second rotors, accordingly, each of which is placed on separate bearings (not shown);
7, 8—inlet (7) and outlet (8) holes for supply of combustible mixture (air) and exhaust of burnt gas, accordingly;
9—spark plug (for carburetor engines) or diesel injector (for diesel engines);
10—internal cylindrical working area of engine body (stator);
11, 12, 13, 14—inlet chamber (11), compression chamber (12), combustion and expansion chamber (13) and exhaust chamber (14), created in parallel in different engine cylinder zones by reciprocal positioning of rotor vanes;
V1, 3—1 and 3 vanes rotation speed of the first rotor;
V2, 4—2 and 4 vanes rotation speed of the second rotor.

Fuel mixture compression degree in the compression chamber (12) and the pressure of the working medium in the combustion and expansion chamber (13), torsion torques of rotors shafts (5 and 6) and the main shaft (19) in corresponding periods of time, as well as correlation between the maximum and minimum rotors rotation speeds are determined by correlations of dimensions that have large and small axles of elliptical gears.

Reaching the optimum correlations of the large and small elliptical gears axles of the prototype is constrained by threat that the teeth of elliptical gears may disengage at certain phases of rotor vanes and gears reciprocal position, presented on diagrams (FIGS. 4 and 5), which is an important constraint for the engine performance enhancement. The diagram (FIG. 4) gives an example of four in eight phases of the rotor vanes reciprocal position and respective phases of elliptical gears reciprocal positions (FIG. 5). Specifically, the following conventions are used for elements, forces and torsion torques of the engine in addition to the given above:

15, 16—elliptical gears rigidly mounted on the shafts of the first (5) and second (6) rotors, accordingly;
17, 18—driving elliptical gears rigidly mounted on the main power take-off shaft of the engine (19);
19—main power take-off shaft of the engine, on which the driving elliptical gears (17 and 18) are rigidly mounted on the main shaft at a 90 degree angle in respect to each other, and kinematically connected with the elliptically-shaped gears of the rotors shafts (15 and 16);
F1, F2—primary forces of the working medium pressure in the combustion and expansion chamber acting on both engine vanes. They are equal by absolute values, but oppositely directed (F1—rotates vanes, shafts and gears in given direction, required for engine operation, and F2—in the opposite one, which to a certain extent slows down its operation, reduces output and efficiency coefficient);
F3, F4—secondary forces, resulted from coupling between driving gears (17 and 18) of the main shaft (19) with gears (15 and 16) of rotors shafts (5 and 6). They coincide by direction and rotate vanes, shafts and gears in direction required for engine operation;
Мкр.1, Мкр.2—are the torsion torques resulting from working medium pressure on the relevant engine vanes and then transmitted during rotation of the rotors shafts (5 and 6) and rigidly mounted thereon gears (15 and 16) to the driving gears (17 and 18). They coincide by direction and rotate vanes, shafts and gears in direction required for engine operation;

Мкр.3, Мкр.4—are the torsion torques resulting from coupling of the rotors shafts gears (15 and 16) with driving gears (17 and 18) and transmitted to the main shaft (19), that coincide by direction and ensure the engine operation;

Мкр.5, Мкр.6—are the torsion torques, which systematically occur upon the action of forces produced by rotation of the rotors shafts (5 and 6) and rigidly mounted thereon gears (15 and 16) in the periods of combustible mixture ignition and initial phase of the working medium expansion in the combustion chamber (13). They do not coincide by direction and create a threat for disengagement of gears (15 and 16) from the relevant driving gears (17 and 18). This threat grows with increasing correlation between the dimensions of the large and small elliptical gears axles and accordingly constrains the possibilities for the engine performance enhancement;

Мкр.7, Мкр.8—are the torsion torques, which occur upon the action of inertial forces produced by the engine elements that gained momentum, transmitted from the main shaft (19) to the driving gears (17 and 18), which coincide with their rotation direction and ensure the stable operation of the engine.

The object-matter of this invention is to improve the rotary engine design by introducing a special reducing gear so as to enhance its performance by ensuring close to the optimum compression degree of combustible mixture in the compression and combustion chambers during various combustion engines operation, intended for certain kind of fuel (petrol of relevant grade, diesel fuel, condensed gas, high spirits, other kinds of fuel or combinations thereof); harmonization of rotors and main shaft torques in a certain periods of time, which will reduce the wasted power used to overcome the resistance of rotors vanes torsion torques, oppositely directed when expanding working medium pressure in combustion chamber simultaneously acts on both engine vanes; as well as reach the rational correlation between the maximum and minimum rotors revolution speed during their operation.

The set goal is achieved by introduction of the reducing gear, including main shaft, rotors shafts and auxiliary device shaft, on which mounted two-tooth gears which crowns have a shape of mating convex and concave arcs, which teeth meshing ensures a kinematic interaction of the rotor shaft gears with the main shaft gears and the auxiliary device gears, as presented on the diagrams (FIG. 6-10), into the rotary vane-type geared internal combustion engine, consisting of stator and two co-axial rotors with two vanes on each.

Introduction of the suggested reducing gear as against use of elliptically-shaped gears (two pairs of non-circular gears) will provide the following advantages.

1. The used shape of two-tooth gears permits to significantly broaden the range of possible correlations between the dimensions of the large and small axles of reduction gear gearwheels, sufficient to ensure optimum correlations between the volumes of inlet, compression, combustion and exhaust chambers, formed by reciprocal position of vanes, and, hence, providing the optimal compression of the combustible mixture in compression and combustion chambers when designing various types of internal combustion engines intended for certain kind of fuel (petrol of certain grade, diesel fuel, condensed gas, high spirits, and other kinds of fuel or combinations thereof).

2. Kinematic connection of the proposed gears takes place due to their teeth meshing mainly in the areas of concave and convex arcs interaction, which increases gears traction coefficient, and, accordingly, improves reliability of torsion torques transmission from rotors shafts to the engine power take-off shaft (except for critical areas described in the next paragraph).

3. The auxiliary device, including shafts and gearwheels of the same shape as described above, which mounted on the shaft by means of bearings and interconnected at the angle of 90 degrees in respect to each other rigidly or with springs of corresponding resistance, ensure reliability of torsions transmission from rotors shafts to the engine power take-off shaft during all phases of the main shaft complete revolution, which is especially important in the critical areas of gears interaction, when as a result of simultaneous action of primary pressure forces created by the working medium in combustion chamber on both engine vanes and secondary forces, resulted from interaction of the main shaft driving gears with rotor shaft gears, the torsion torques of various levels are created directed both ways, as it shown on the diagram (FIG. 7). In addition, the auxiliary device ensures given relative position of rotors, shafts and gears in a static, pre-starting state of engine, which is especially important for its start-up and subsequent stable operation.

The specified diagram provides an example of three in eight phases of mutual positioning of the proposed rotors gears (21, 22), main shaft driving gears (23, 24) and auxiliary devices gears (25, 26), stipulated by relevant rotor vanes mutual positioning phases (FIG. 4). Specifically, the following conventions are used for engine elements and forces in addition to the given above:

20—the auxiliary device shaft, on which the proposed auxiliary device gears (25 and 26), kinematically coupled with rotors shafts gears (21, 22), are mounted at the angle of 90 degrees in respect to each other on the shaft rigidly or by means of appropriate springs on bearings (not shown);

F5, F6—forces, resulted from coupling of the proposed rotors shafts gears (21, 22) with the auxiliary device gears (25, 26), ensuring systematic compression of this device springs (and their reactive recoil) under additional load in the periods after combustible mixture ignition and expansion of working medium in the engine combustion chamber (13), which removes the threat of rotors shafts gears (21, 22) disengagement from the relevant driving gears (23, 24) of the main shaft;

F7, F8—forces, resulted from auxiliary torsion device springs recoil during the next phase of the proposed auxiliary device gears (25, 26) interaction with the rotors shafts gears (21, 22), coinciding by direction and ensuring systematical transmission via them of additional forces to the main shaft gears facilitating engine operation, increase its power and efficiency;

Мкр.9, Мкр.10, Мкр.11, Мкр.12—torsion torques resulting from coupling of rotors shafts gears (21, 22), with the auxiliary device gears (25 and 26). They coincide by direction and ensure the engine stable operation.

As a result of the aforesaid advantages the proposed rotary vane-type geared internal combustion engine will increase the efficiency up to 85-95%, while the efficiency of piston engines is 35-45%, and of others rotary internal combustion engines—does not exceed 50-60%. Accordingly, the specific consumption of fuel by the proposed rotary engine will reduce 1.5-1.8 times as compared to the most widespread piston engines, and the specific materials consumption will reduce by 30-40%. Since all four cycles of the proposed engine are run in parallel in its various areas (chambers), created by mutual positioning of rotor vanes, the aggregate ratio of the power stroke period increases 3.5-4 times as against the piston ones. Consequently, the same engine capacity permits to obtain the same power at its lowest revolutions. Or vice-versa, while preserving the revolutions of the engine per time unit there is a possibility to correspondingly reduce its capacity and dimensions, while preserving its power. Besides, the relative increase of the power stroke period will decrease the requirements to the octan unit of the combustible mixture. This allows using more efficiently less expensive grades of fuel, as well as diesel fuel, condensed gas, high spirits, other kinds of fuel or combinations thereof and reduces the pollution of the environment with harmful substances. The simultaneous formation of working chambers in various zones of the engine by reciprocal positioning of rotors vanes and their consecutive travel around the roll axis inside cylindrical working surface of the engine unit, allows using both traditional and incandescent ignition of combustible mixture, to which purpose an appropriate spark plug is introduced to the combustion chamber. The operational reliability and service-life of the proposed vane-types geared engines will increase.

The main components of the proposed engine design are:
1) unit with internal cylindrical working area;
2) two co-axial two-vane rotors;
3) unit covers;
4) two-tooth gears, which crown has a shape of mating convex and concave arcs;
5) shafts;
6) bearings;
7) springs.

The engine operation is provided by the following systems: air-fuel preparation and supply, ignition. cooling; and lubrication, which are similar to the systems of other engines, but significantly simpler. Gas distribution mechanism is absent as there is no need in it. The air-fuel mixture in carburetor engines and air—in diesel ones intakes into the engine via corresponding inlet openings of the unit or unit covers into the inlet chamber. The burnt gases are pushed into the exhaust channels via corresponding outlet channels of the unit or unit covers during rotor vanes rotation, which during their operation act simultaneously like a pump.

The air-fuel mixture ignition in carburetor or fuel injection in diesel engines is takes place like in ordinary piston engine by means of spark-plug or nozzle, accordingly, installed in the body or body cover of the rotary internal combustion engine. Besides, as it was said before, it is also possible to use incandescent air-fuel ignition method (9).

The specific engine design based upon utilization of the proposed device may be selected by producer depending upon the state-of-the-art, target horsepower and its purpose. The co-axial two-vane rotors may be placed under either option: in sequence, along the axle inside the common internal cylindrical working area of the unit, or one inside the other around the common stationary central engine rotation axle. The proposed reducing gear position may also vary: in a single unit nearby stator and rotors or as a stand-alone device, providing for a relevant mechanism of its mounting and torsion torques transmission from rotors to shafts and gearwheels, various options for air-fuel mixture supply and burnt gases exhaust, packing of moving elements to ensure required compression in the intake, compression, combustion and exhaust chambers.

The example of a possible design option of the proposed reducing gear is presented on the diagrams (FIG. 8-10). To avoid crossing of the proposed main shaft driving gears (23, 24) with corresponding auxiliary device gears (25, 26) they are to be placed in different rotation planes. At the same time to ensure a stable given coupling of interacting elements, the thickness of each rotor shaft gear (21 and 22) shall slightly exceed the sum of the main shaft gear thickness (23 or 24) and thickness of the relevant auxiliary device gear (25 or 26). It would also be rational to divide the rotors shafts gears (21 and 22) in two parts, and each part shall be proportional to the relevant driving gear of the main shaft (23 or 24) or to the gear of the auxiliary device (25 or 26), which will simplify bedding of the crowns of each pair of coupled gears during their production.

The invention claimed is:

1. A rotary vane geared internal combustion engine comprising:
   a stator which has an internal cylindrical working area and intake and outlet openings, where two coaxial rotors with two vanes on each rotate to define four chambers separated by four vanes; and
   a reducing gear assembly having a main shaft, a shaft of an auxiliary device and a power shaft comprising two rotor shafts of the two coaxial rotors positioned between the main shaft and the shaft of the auxiliary device;
   the main shaft, the shaft of the auxiliary device and the power shaft each having a pair of two-tooth gears reciprocally positioned at a 90 degree angle relative to each other;
   a profile of the two-tooth gear having two convex arcs and two concave arcs, the convex arc of the two-tooth gear on one shaft adapted to mate with the concave arc of the two-tooth gear on the other shaft, one of the pair of two-tooth gears on the power shaft adapted to mate with one of the pair of two-tooth gears on the main shaft, and adapted to mate with one of the pair of two-tooth gears on the shaft of the auxiliary device, the other of the pair of two-tooth gears on the power shaft adapted to mate with the other of the pair of two-tooth gears on the main shaft, and adapted to mate with the other of the pair of two-tooth gears on the shaft of the auxiliary device.

2. The rotary vane geared internal combustion engine according to claim 1, in which the internal cylindrical working area of the stator has two intake openings at diametrically opposing positions and two outlet openings at diametrically opposing positions.

* * * * *